T. J. HENDRICKSON.
Cess-Pools.
No. 157,686. Patented Dec. 15, 1874.
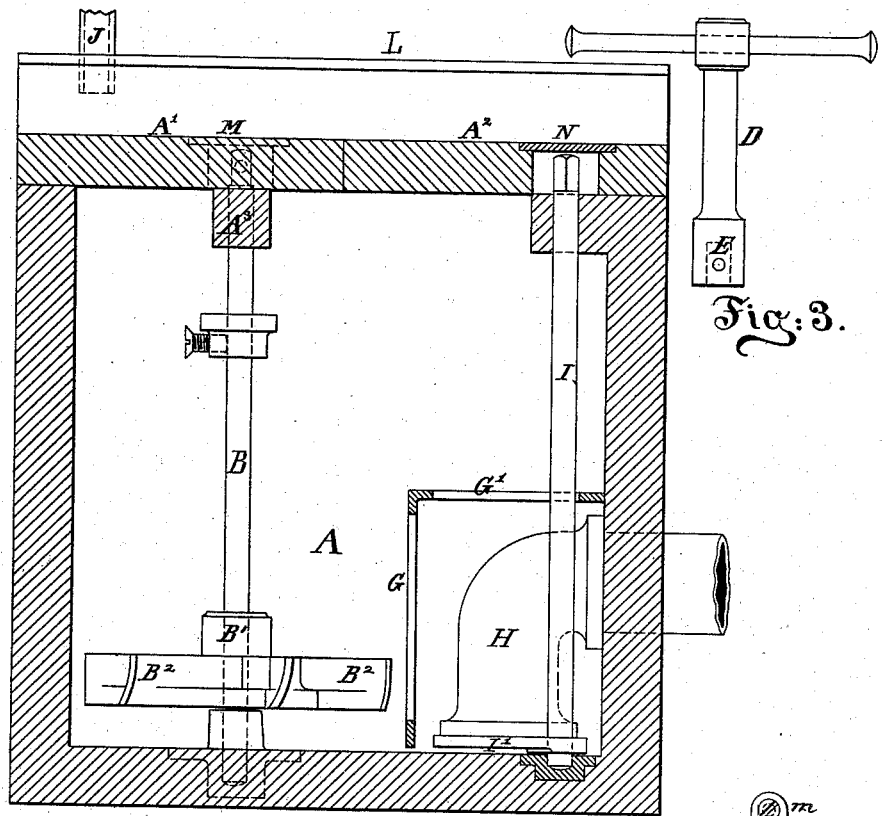
Fig. 1.
Fig. 3.
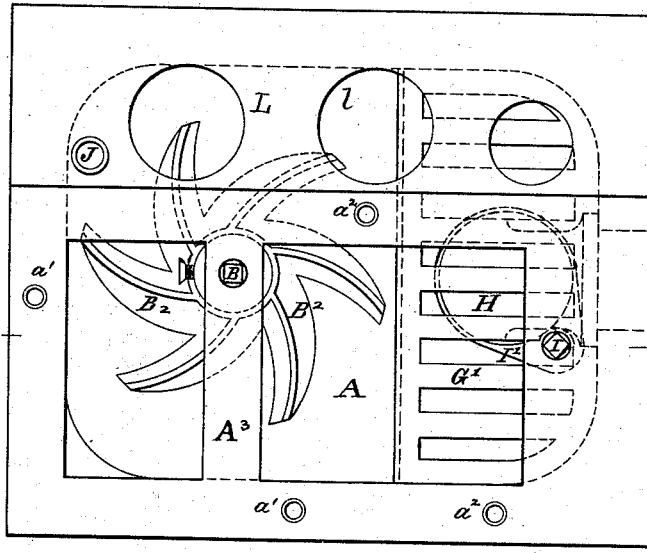
Fig. 2.
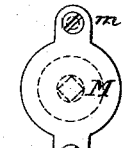
Fig. 4.
Witnesses:
Inventor:
T. J. Hendrickson
by his attorney

UNITED STATES PATENT OFFICE.

THOMAS J. HENDRICKSON, OF WILLIAMSBURG, BROOKLYN, ASSIGNOR TO HIMSELF AND HUBBARD HENDRICKSON, OF BROOKLYN, NEW YORK.

IMPROVEMENT IN CESS-POOLS.

Specification forming part of Letters Patent No. 157,686, dated December 15, 1874; application filed August 6, 1874.

*To all whom it may concern:*

Be it known that I, THOMAS J. HENDRICKSON, of Williamsburg, Brooklyn, in the county of Kings, in the State of New York, have invented certain Improvements relating to Privy Cess-Pools and their connections, of which the following is a specification:

The invention is intended for water-closet or privy apparatus, more particularly for that class of houses occupied by ignorant or careless tenants, who cannot be relied upon to pull any handles or take other ordinary means of securing the action of the apparatus after each use. I adopt, in part, the common plan, in such cases, of employing a sufficiently large receptacle or cess-pool in which to accumulate the solid and fluid matter for a considerable period. Instead, however, of relying on an occasional deluge of water from the roof, or an occasional letting on of water from the street-mains or other source, to wash out the receptacle without further help, I provide special means for facilitating the cleansing. I mount a revolving part having arms adapted to the matter at the bottom, and provide means for turning it when required, and for preventing it from being disturbed at other times. I also provide a valve which shall prevent the escape of the water for a little time, in order to more thoroughly mix up the matter, and then to allow it to escape suddenly. I provide, also, a grating, which serves to prevent the foreign matter from clogging the escape-orifice.

The following is a description of what I consider the best means of carrying out the invention.

The accompanying drawings form a part of this specification.

Figure 1 is a vertical section, and Fig. 2 a plan view with the foot-boards or flooring removed.

Similar letters of reference indicate like parts in all the figures.

A is the main casing or cess-pool, preferably of masonry efficiently lined. $A^1 A^2$ are removable covers, secured by stout screws $a^1 a^2$, and which form the whole or a portion of the floor of the closet, which has seats L, with holes $l$ for their obvious functions. B is an upright shaft, having a bearing in a cross-piece, $A^3$, which may be removed when required, and steadied at the bottom in a step, preferably of considerable depth. $B^1$ is a boss keyed thereon, and $B^2$ are arms, which extend therefrom. They are preferably curved, as shown, and also connected, so as to stand obliquely to the radial line, and flattened and skewed like the blades of a screw-propeller. Turning the shaft B always tends to agitate the material by the action of the arms $B^2$. Turning it in one direction tends to throw off any solid matter, while turning it in the other direction tends to draw it together. In practice it may be turned intermittently in the two directions. A sufficiently large hole is formed in the flooring-plank $A^1$ to allow the insertion of a stout socket-key, D, adapted to match on the square head of the shaft B, and provided with means for powerfully turning the latter. A cross-pin, E, may be inserted through a hole provided for the purpose through the key D, also through the head of the shaft B. By means of this pin E, I can so connect the parts that the shaft B and its connections may be strongly lifted. The nature of the offensive material treated is such that it sometimes becomes very hard at the bottom. In such cases the shaft and its connections should be elevated and turned at the top, being allowed to sink gradually as it agitates and loosens the material. A cover, M, provided with two lugs, as shown, is matched into the floor, so as to cover the hole and be secured by screws $m$. G is an upright grating, and G' is a corresponding horizontal grating. The entire grating G G' shields the bent end of the exit-pipe H, which, it will be understood, communicates with the sewer. (Not represented.) I is an upright shaft, covered, to prevent improper disturbance, in the same manner as above described for the shaft B. The shaft I stands near the exit-pipe H, and is provided with a broad ring, I', which, when the shaft I is turned in the proper direction, slides across the bent-down end of the pipe H, and nearly or quite stops it. By setting the wing I' a little inclined, and finishing the bent end of the pipe H with a corresponding inclination, the fit may be made sufficiently tight for the purpose required, which is to stop the escape of the water during the brief period while the agitator is being operated.

In the working of the apparatus the owner or agent of the building, or other reliable attendant, goes to the apparatus, preferably during a rainfall, when water is being received from the roof through the pipe J, and is actively escaping through the pipe H, or, if such an opportunity cannot be made available, lets on a more or less liberal supply of water from some other source. He removes the covers M and N, applies his key D to the shaft I, and turns it so as to bring the valve I' across the mouth of the exit-pipe H. Now, with the water accumulating in the receptacle A, he applies his key to the shaft B and turns it repeatedly, first in one direction and then in the other, introducing the cross-pin E and lifting the agitator, if necessary. After a little time he opens the valve I' and allows as much as will to escape, repeating the process if necessary, and concluding the operation by taking care to set the valve I' wide open, and again replace and secure the covers M and N.

I have had much experience with apparatus of this general class, and believe that the iron, if unprotected, will not corrode sufficiently to induce mischief. It would be preferable, however, to use galvanized iron. Care must be taken not to keep the valve I' closed but a very brief period when an active current is being received through the pipe J, or from any other source. The gratings G and G' should be occasionally attended to, in order to remove any rags or other rubbish which may accumulate on them.

I am aware that it has been common to provide receptacles A, in connection with privies or water-closets, to hold an accumulation to be washed out at intervals, and also that it has been common to employ an exit-pipe, H, penetrating the walls considerably above the bottom, and bent down inside near the bottom, so as to act siphonwise, or as a stench-trap, in discharging the contents at intervals; but

I claim as my invention—

1. In combination with a privy cess-pool, A, having a seat, L l, above, and provision for inducting and educting fluid or semi-fluid material, the agitating-arms $B^2$, with a shaft, B, and key D for operating the same, substantially in the manner and for the purposes herein set forth.

2. In combination with a privy cess-pool, A, having a seat, L l, and an agitator, B $B^2$, and provisions for inducting and educting fluids, as specified, the stop-valve I', controlling the discharge, and means E for lifting the agitator, so as to allow the detention of water and the agitating at different levels, as herein specified.

3. The stationary cage or grating G G', in combination with the stop-valve I', and with the operating-rod I, arranged to extend through the grating, substantially as herein specified.

In testimony whereof I have hereunto set my hand this 27th day of July, 1874, in the presence of two subscribing witnesses.

THOS. J. HENDRICKSON.

Witnesses:
 WM. C. DEY,
 THOMAS D. STETSON.